(12) United States Patent
Fahnline (10) Patent No.: US 8,833,189 B2
(45) Date of Patent: Sep. 16, 2014

(54) GYROSCOPE DEVICE

(71) Applicant: Richard Alan Fahnline, Evergreen, CO (US)

(72) Inventor: Richard Alan Fahnline, Evergreen, CO (US)

(*) Notice: Subject to any disclaimer, the term of this patent is extended or adjusted under 35 U.S.C. 154(b) by 101 days.

(21) Appl. No.: 13/633,150

(22) Filed: Oct. 2, 2012

(65) Prior Publication Data

US 2014/0090493 A1    Apr. 3, 2014

(51) Int. Cl.
*G01C 19/06* (2006.01)

(52) U.S. Cl.
USPC .................................................... 74/5.7

(58) Field of Classification Search
CPC ...... G01C 21/18; G01C 19/025; G01C 19/26; G01C 19/20; G01C 19/00; G01C 19/12; G01C 19/06; G01C 19/36; G01C 19/38; G01C 19/04; G01C 19/44; G01C 19/02
USPC ............... 74/5.12, 5.14, 5.37, 5.4, 5.41–5.43, 74/5.47, 5.7, 5.6 D, 5.9; 466/233–235, 466/237, 259
See application file for complete search history.

(56) References Cited

U.S. PATENT DOCUMENTS

| | | | |
|---|---|---|---|
| 3,373,832 A | | 3/1968 | Summers |
| 3,628,285 A | * | 12/1971 | Murakami ............... 446/233 |
| 3,765,250 A | * | 10/1973 | Graefe ...................... 74/5 R |
| RE30,299 E | | 6/1980 | Greenwood |
| 5,820,439 A | | 10/1998 | Hair |
| 5,823,845 A | | 10/1998 | O'Berrigan |
| 6,020,875 A | * | 2/2000 | Moore et al. ............ 345/156 |
| 6,042,449 A | | 3/2000 | Ishimoto |
| 6,406,349 B1 | * | 6/2002 | Chung ..................... 446/235 |
| 6,458,008 B1 | * | 10/2002 | Hyneman ................ 446/259 |
| 6,615,681 B1 | * | 9/2003 | Jenkins et al. ........... 74/5.46 |
| 6,764,374 B2 | | 7/2004 | Tilbor |
| 6,969,296 B1 | * | 11/2005 | Chen ....................... 446/242 |
| 7,936,984 B2 | * | 5/2011 | Greb et al. ................ 396/55 |
| 8,297,138 B2 | * | 10/2012 | Harrison .................. 74/5.37 |

* cited by examiner

*Primary Examiner* — Troy Chambers
*Assistant Examiner* — Jude Agendia
(74) *Attorney, Agent, or Firm* — Mark D. Trenner; Trenner Law Firm, LLC (57) ABSTRACT

A gyroscope device and method are disclosed. An example of the gyroscope device includes a gyroscope element and a frame. A drive element for spinning the gyroscope element which also results in torque on the frame parallel to an axis of rotation of the gyroscope. A first torque application element is mounted on the frame to counter torque produced by the drive element to subsequently restrict the frame from freely rotating in a direction counter to the gyroscope element. A second torque application element imposes a torque on the frame perpendicular to the axis of rotation of the gyroscope element to tilt the axis of the gyroscope and effect direction of motion.

20 Claims, 6 Drawing Sheets

GYROSCOPE DEVICE

BACKGROUND

Gyroscopes are well known for utilizing angular momentum to maintain a constant orientation during movement. A basic gyroscope has a wheel that can spin when mounted in a gimbal. Orientation of the axis of the spinning wheel changes in response to application of an external force. Orientation of the gimbal remains substantially fixed, regardless of motion of the wheel.

During World War II, gyroscopes were used for aircraft and anti-aircraft gun sights. After the war, miniature gyroscopes were used for guided missiles and weapons navigation systems. Micro-Electro-Mechanical Systems (MEMS)-based gyroscopes are used today in portable electronic devices such as the Apple iPhone® and iPad®. The Chandler Company created a gyroscope toy with a pull string and pedestal in the early 1900's, which is still produced today.

DETAILED DESCRIPTION

A gyroscope device is disclosed herein which may be used as a toy or (in a larger version) as a vehicle. An example of the gyroscope device includes a spinning gyroscope element. The spinning element which is used to produce the gyroscopic effect shall be referred to herein as the gyroscope element. A drive element is mounted to a platform or frame of the gyroscope device to spin the gyroscope element. The drive element imposes a torque on the frame which is reverse the torque imposed on the gyroscope element and which is parallel to the axis of the gyroscope element. This torque is opposed by a counter torque to restrict the free rotation of the frame in the direction opposite that of the gyroscope element. Another torque is imposed on the frame which is perpendicular to the axis of the gyroscope element to effect direction of motion. The torque may be imposed by air jets, by shifting weight on the frame of the device to alter the center of gravity. A drive shaft is located at the axis of the gyroscope element and connected at a top end to the drive element. The bottom end of the drive shaft is unrestrained and in contact with a generally flat surface.

It is important to differentiate between the torque (or "counter torque") imposed or applied parallel to the axis of rotation of the gyroscope element (to restrict rotation of the frame); and a separate torque imposed/applied perpendicular to the axis of rotation of the gyroscope element, to tilt the axis of rotation of the gyroscope element and subsequently cause rolling contact between the bottom of the drive shaft and the surface.

It is noted that the spinning part of the device (referred to by reference number 12 below) as the gyroscope element, because a "gyroscope" can mean the entire device, not just the spinning part of the device. In addition, the term "downward force" is used herein to describe the downward force which is parallel to the axis of the gyroscope element results in a torque which is perpendicular to the axis of the gyroscope element.

The behavior of a gyroscope can be described mathematically according to the following equation:

$$\tau = \frac{dL}{dt} = \frac{d(I\omega)}{dt} = I\alpha$$

In the above equation, $\tau$ is torque and L is the angular momentum of the gyroscope. The scalar I is the moment of inertia, $\omega$ is the angular velocity, and $\alpha$ is the angular acceleration of the gyroscope. When a torque is applied perpendicular to the axis of rotation, the gyroscope rotates about an axis that is perpendicular to both $\tau$ and L. The angular velocity $\Omega_P$ is given by the cross product:

$$\tau = \Omega_P \times L.$$

When a gyroscope is spinning, its axis remains horizontal and the gyroscope appears to defy gravity. Rotation resulting from the torque is perpendicular to both the gravitational torque (horizontal and perpendicular to the axis of rotation) and the axis of rotation (horizontal and outward from the point of support), causing the gyroscope to rotate.

As applied to the gyroscope device disclosed herein, the drive element imposes a torque on the frame which is parallel to the axis of rotation of the gyroscope element, and reverse the torque imposed on the gyroscope element. A counter torque is produced by a control element upon the frame to subsequently restrict the frame from freely rotating in a direction counter to the gyroscope element. A second torque application element separately imposes a torque on the frame which is perpendicular to the axis of rotation of the gyroscope element in order to tilt the axis of the gyroscope and effect motion. The torque imposed perpendicular to the axis of rotation of the gyroscope tilts the axis of the gyroscope in a direction perpendicular to the applied torque (as would result from the gyroscopic effect), and subsequently tilts the drive shaft so that the bottom of the shaft makes rolling contact with the surface and propels the device forward/backward/sideways (e.g., depending upon the orientation of the imposed torque on the frame).

Before continuing, it is noted that as used herein, the terms "includes" and "including" mean, but is not limited to, "includes" or "including" and "includes at least" or "including at least." The term "based on" means "based on" and "based at least in part on."

Figure 1:
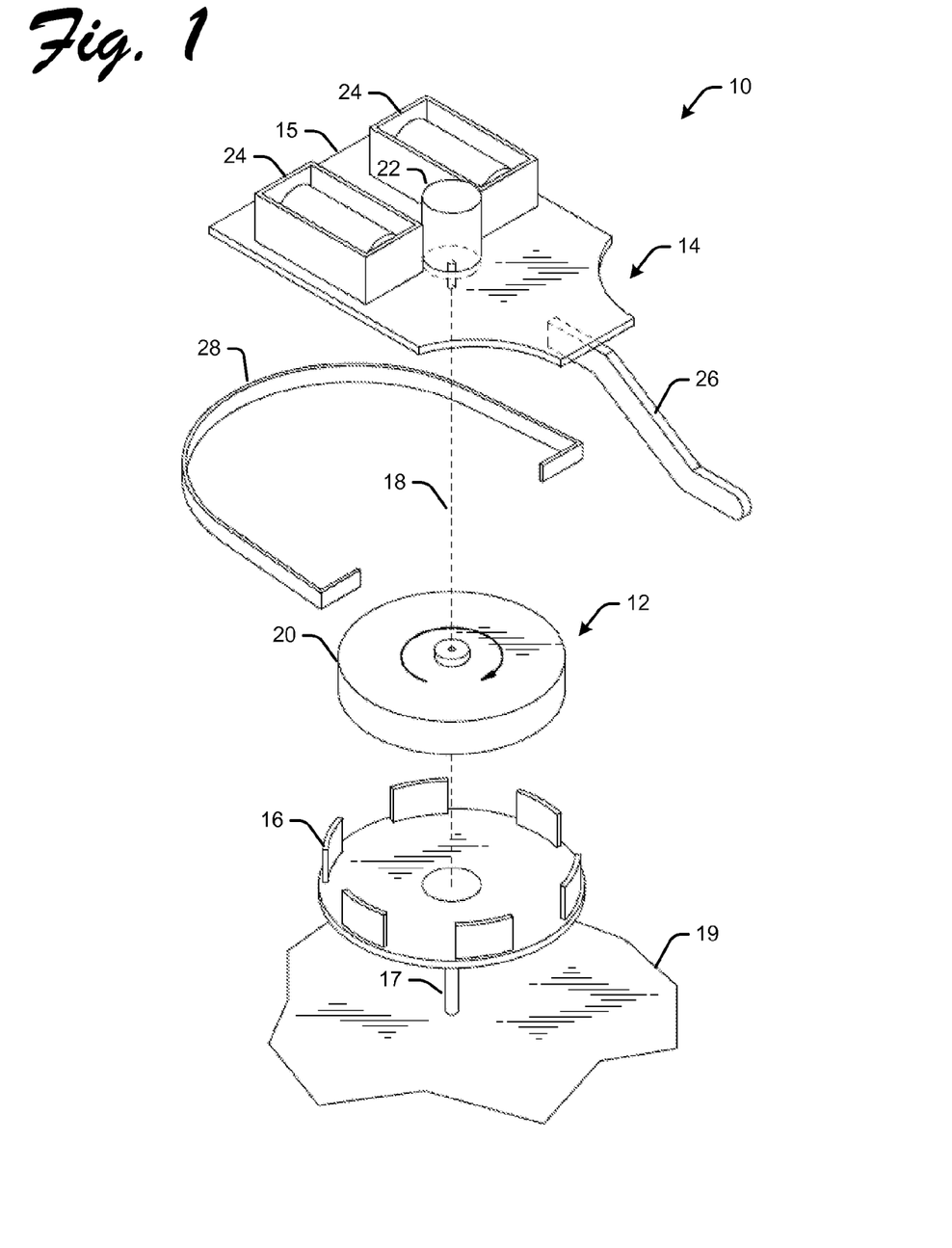
FIG. 1 is an exploded perspective view of an example gyroscope device.
Figure 2A:
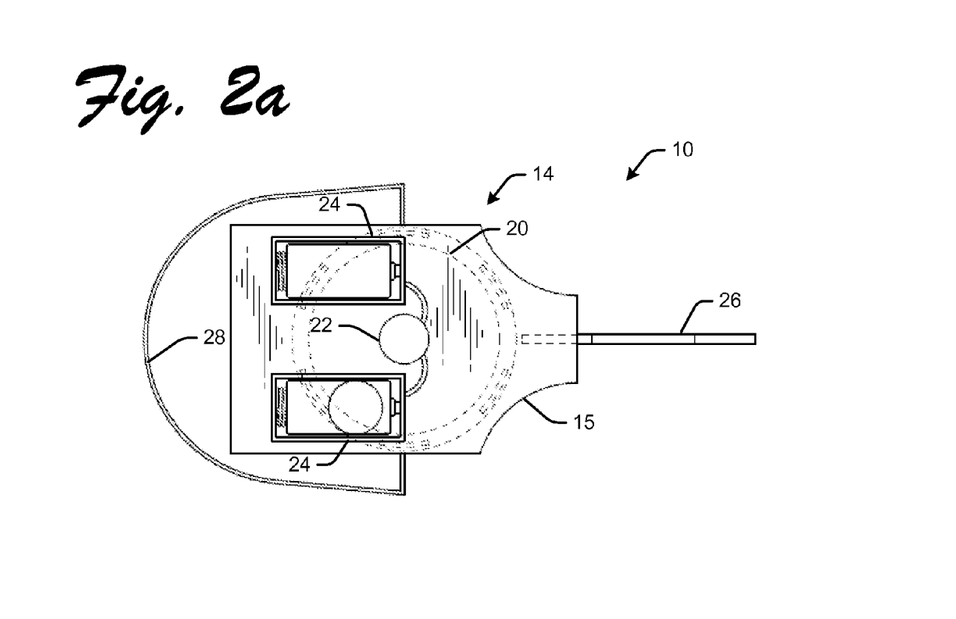
FIGS. 2a-b show (a) a top view, and (b) a side view, of the example gyroscope device shown in FIG. 1.
Figure 2B:
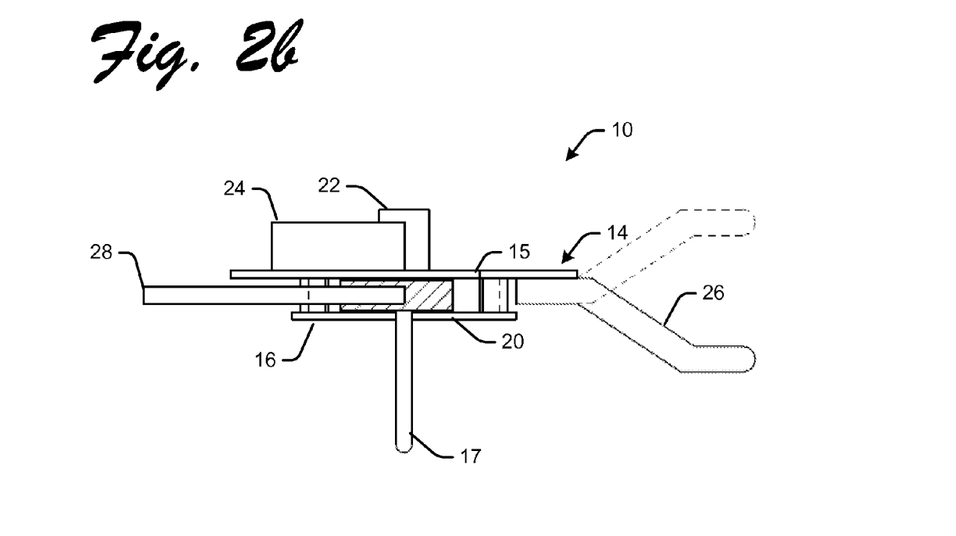

FIG. 1 is an exploded perspective view of an example gyroscope device 10. FIGS. 2a-b show (a) a top view, and (b) a side view, of the example gyroscope device 10 shown in FIG. 1. The gyroscope device 10 has a spinning gyroscope element 12 and a substantially stationary frame 14 (relative to motion of the gyroscope element 12). The frame 14 may include a top portion 15 and container portion 16. The gyroscope element 12 includes a shaft 17 defining an axis 18, and a disk 20. Container portion 16 of the frame 14 may house the disk 20. A lower portion of the shaft 17 may be rounded for contact with a substantially flat floor 19 or other surface (e.g., the tracks shown in FIGS. 5a-b).

A drive element 22 is provided on the frame 14. The drive element 22 may be an electric motor powered by batteries 24. The drive element 22 may be operatively associated with the gyroscope element 12, for example, by connection via a center of the disk 20 and shaft 17. The gyroscope device 10 may also include a tail 26 and bumper 28 on the frame 14.

Figure 3A:
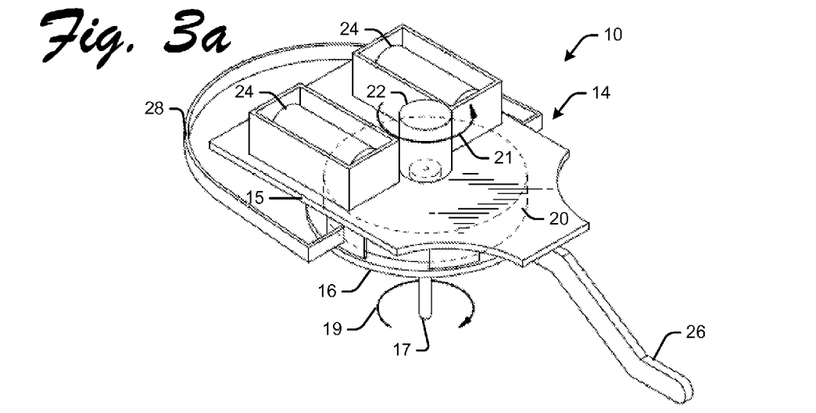
FIGS. 3a-b are perspective views of the example gyroscope device shown in FIG. 1 illustrating motion.
Figure 3B:
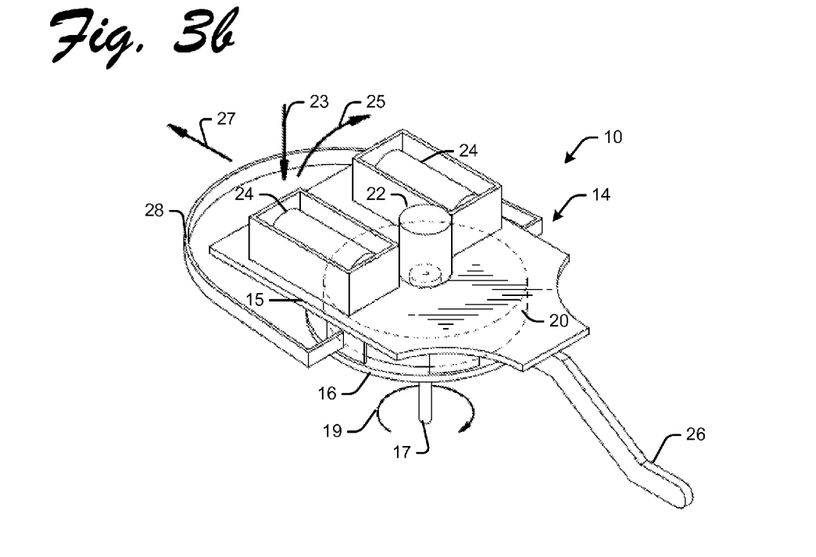

FIGS. 3a-b are perspective views of the example gyroscope device shown in FIG. 1 illustrating motion. During operation, the gyroscope element 12 spins (e.g., as illustrated by arrow 19) about an axis 18 (see FIG. 1) defined by the shaft 17. A gyroscope element may have a rotor with journals mounted in a gimbal. The gyroscope element 12 is mounted in the frame 14 so as to pivot about an axis in its own plane that is always perpendicular to the pivotal axis of the frame 14.

The shaft 17 defines the spin axis of the disk 20. The disk 20 is journaled to spin about an axis, which is always perpendicular to the axis of the shaft 17. The disk 20 responds to a force applied to shaft by a reaction force about the output axis.

The center of gravity of the disk 20 can be in a fixed position. The disk 20 simultaneously spins about one axis and is capable of oscillating about the two other axes, and, thus, except for resistance due to friction, the disk 20 is free to spin in any direction about that fixed point.

A torque application element may keep the frame 14 of the device 10 from rotating as a result of torque produced by the drive element 22. Otherwise, the frame 14 may freely rotate opposite the direction of the gyroscope element (disk 20). In an example, the torque application element may include a fan or air jet produced by a propulsion system (not shown) mounted to the frame 14 of the device 10 to produce a force to counter the torque of the drive element.

In addition to preventing free rotation of the frame 14 of the device 10, the counter-torque 21 produced by the torque application element may be remotely adjustable when the device 10 is used as a toy, or manually adjustable when the device 10 is used as a recreational vehicle in order to redirect the orientation of the frame 14 of the device 10. The means of redirecting the orientation of the frame of the device may also be used for acceleration and deceleration of the device 10.

Motion of the device 10 may be produced by imposing a force 23 upon the frame 14 of the device 10, which in turn through gyroscopic effect, tilts 25 the gyroscope element 12 and frame 14 of the device 10, which in turn allows a bottom end of the shaft 17 to make rolling contact with the supporting surface and result in the movement 27 of the device 10. The direction (forward, backward, and/or sideways) of movement of the device 10 depends at least to some extent on the direction of the imposed torque on the frame 14 of the device 10.

Means for imposing force 23 on the frame 14 of the device 10 may also include shifting of weight on the frame of the device (e.g., via movement of the batteries 24, tail 26, and/or bumper 28) to alter the center of gravity of the device 10.

A downward force imposed parallel to the axis 18 of the device 10 causes a torque which is perpendicular to the shift of the gyroscope element and tends to move the device 10 in the same direction as the orientation of the downward force. A downward force imposed on the front of the frame 14 of the device 10 tends to cause the device 10 to move forward. A downward force imposed on the back of the frame 14 of the device 10 tends to cause the device 10 to move in reverse. It is noted that the directions referred to herein are relative directions of motion, and are not intended to be limiting in any manner.

Figure 4A:
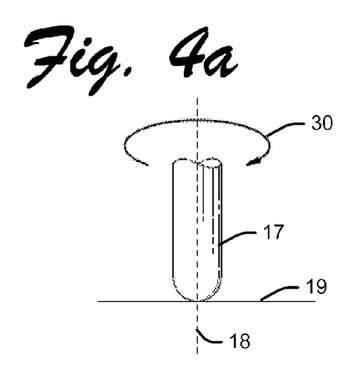
FIGS. 4a-b are detailed perspective views of a shaft of the example gyroscope device shown in FIG. 1.
Figure 4B:
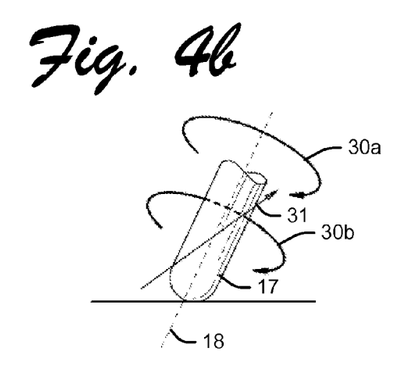

FIGS. 4a-b are detailed perspective views showing the shaft 17 of the example gyroscope device 10 shown in FIG. 1. FIG. 4a shows the axis 18 of the shaft 17 in neutral contact with a surface 19, resulting in little or no device movement. FIG. 4b shows the axis 18 tilting and the shaft 17 in rolling contact with the surface, effecting movement of the device 10.

In an example, the gyroscope element 12 is spun in a clockwise direction 30a-b. The center of gravity may be in a neutral position (as illustrated in FIG. 4a), which results in minimal or no linear motion. By applying a force to the frame 14 (e.g., adjusting position of the batteries 24 forward), the offset center of gravity imposes a downward force on the front of the frame 14 of the device 10. Through gyroscopic effect, the torque resulting from this imposed force tilts the frame 14 and gyroscope 12 to the right (as illustrated in FIG. 4b) which causes rolling contact at the bottom of the shaft 17, and results in forward movement 31 of the device 10 along the surface 19.

Figure 5A:
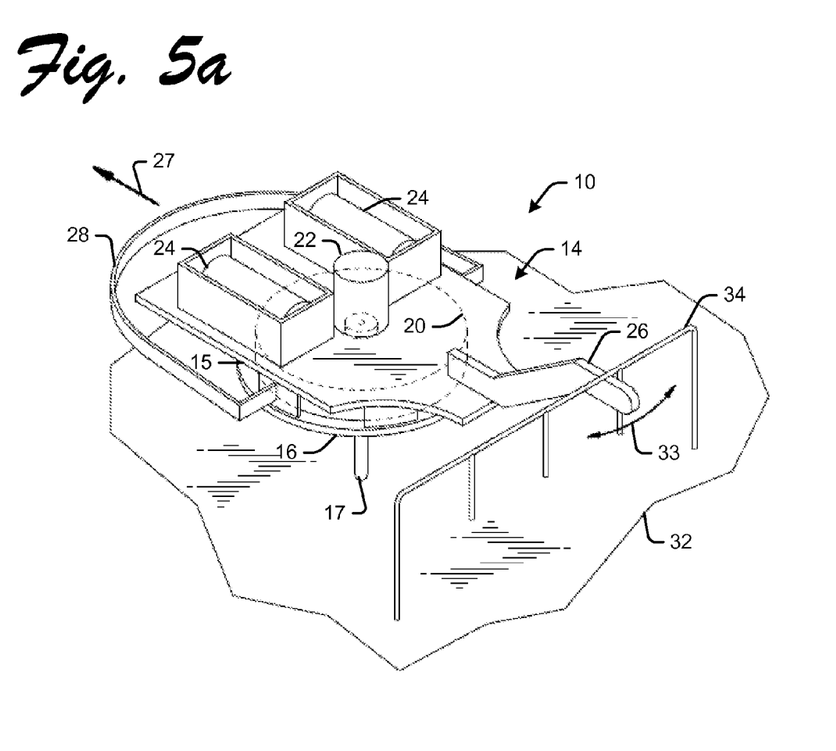
FIG. 5a-b are perspective views of the example gyroscope device shown during use.
Figure 5B:
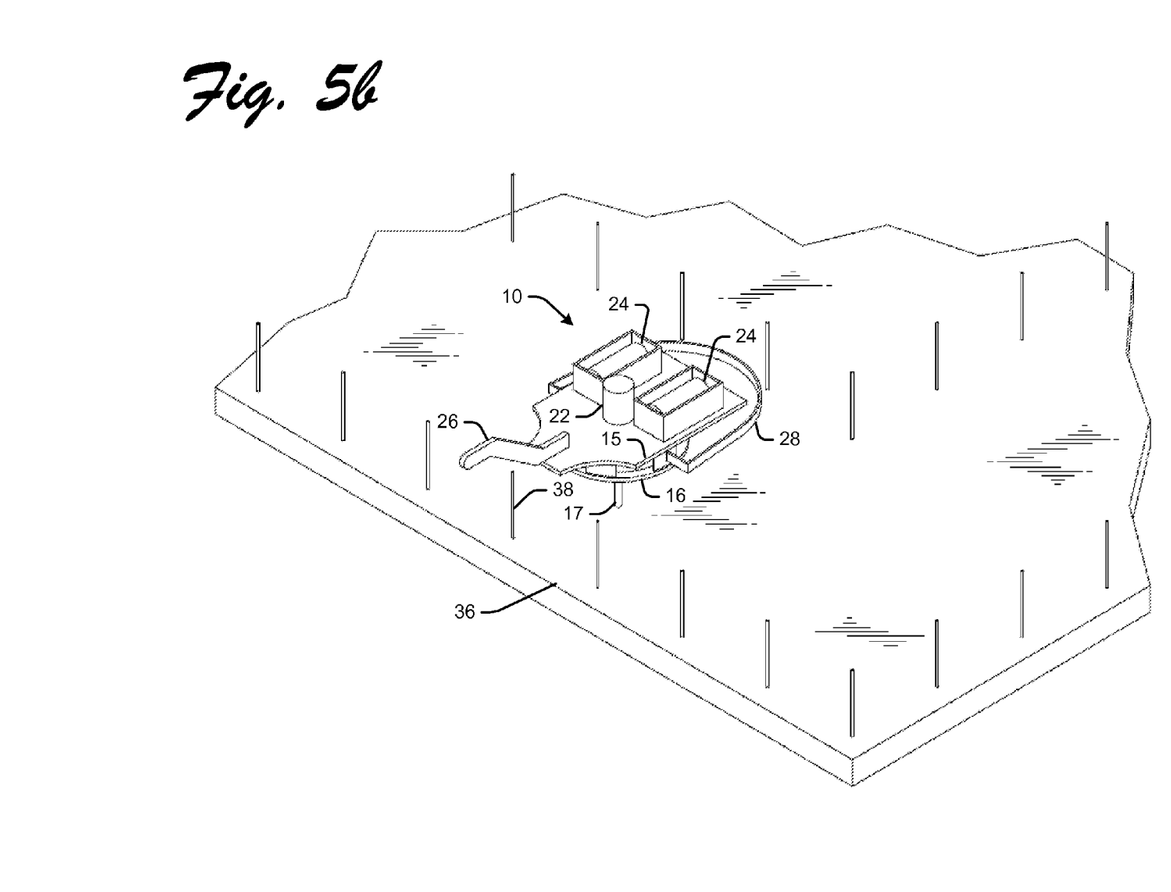

FIG. 5a is a perspective view of the example gyroscope device 10 shown during use. In FIG. 5a, the surface includes a track 32 having one or more barriers provided as a rail 34 that restricts motion 33 of the tail 26 and affecting direction of motion 27. FIG. 5b is another perspective view of the example gyroscope device 10 shown during use. In FIG. 5b, the surface includes a track 36 having one or more barriers shaped as pegs 38. The tail 26 and/or bumper 28 functions in conjunction with the barriers to reduce or altogether prevent rotation of the frame 14, while effecting movement of the device 10 in the tracks 32 or 36.

While the gyroscope device 10 has been illustrated herein with reference to a toy, the gyroscope device 10 is not limited in function. As mentioned above, the gyroscope device 10 may also be used as a recreational vehicle having a spinning gyroscopic element driven by a motor, engine or human power. As a recreational vehicle the device 10 may be sufficiently large to support the weight of a person, with the person providing power to spin the gyroscope element and control movement of the vehicle.

Before continuing, it should be noted that the examples described above are provided for purposes of illustration, and are not intended to be limiting. Other devices and/or device configurations may be utilized to carry out the operations described herein.

Figure 6:
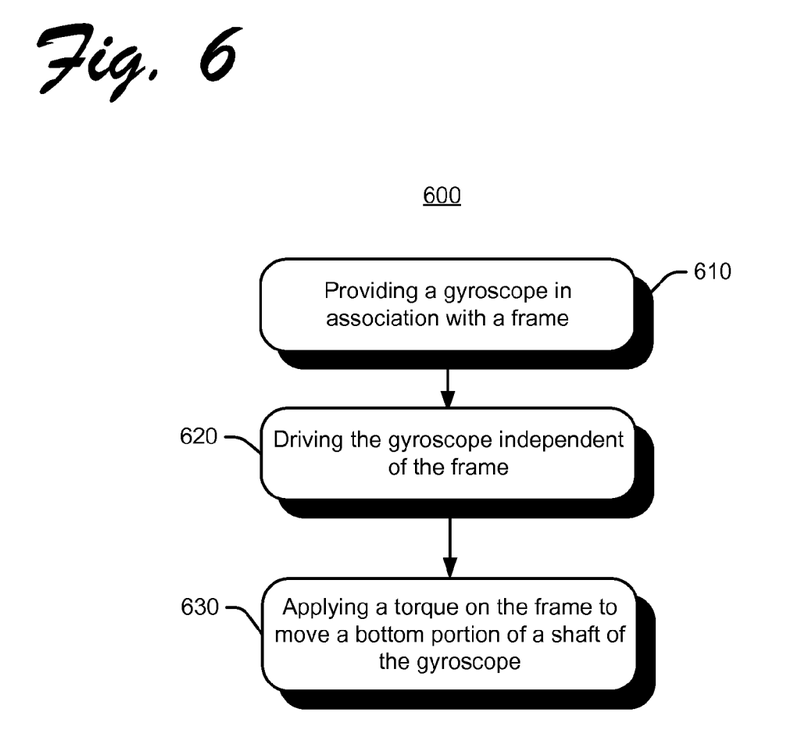
FIG. 6 is a flowchart illustrating example operations which may be implemented for a gyroscope device.

FIG. 6 is a flowchart illustrating example operations 600 which may be implemented for a gyroscope device. In an example, the components and connections depicted in the figures may be used.

Operation 610 includes providing a gyroscope in association with a frame. Operation 620 includes driving the gyroscope independent of the frame. Operation 630 includes applying a torque on the frame to move a bottom portion of a shaft of the gyroscope along a surface.

The operations shown and described herein are provided to illustrate example implementations. It is noted that the operations are not limited to the ordering shown. Still other operations may also be implemented.

Still further operations may include applying a downward force on a front of the frame for forward motion. Operations may also include applying a downward force on a back of the frame for reverse motion. Operations may also include applying a downward force to the frame in a direction parallel to an axis of the gyroscope for motion in a same direction as an orientation of the downward torque. Operations may also include restricting free rotation of the frame. Operations may also include tilting the frame from a neutral axis to cause rolling contact of the bottom portion of the shaft of the gyroscope with the surface.

It is noted that the examples shown and described are provided for purposes of illustration and are not intended to be limiting. Still other examples are also contemplated.

The invention claimed is:
1. A gyroscope device, comprising:
a gyroscope element;
a frame;
a drive element mounted on the frame for spinning the gyroscope element which results in a torque on the frame which is parallel to an axis of rotation of the gyroscope element and which reverse the torque imposed on the gyroscope element to spin the gyroscope element;

a first torque application element mounted on the frame to counter the torque produced by the drive element on the frame and to subsequently restrict the frame from freely rotating in a direction counter to that of the gyroscope element, the first torque application element stabilizing the frame against the torque produced by the drive element and thereby enabling a second torque application element to control the linear motion of the gyroscope device; and a second torque application element to impose a torque on the frame perpendicular to the axis of rotation of the gyroscope element to tilt the axis of the gyroscope element through gyroscopic effect and control direction of motion of the device.

2. The gyroscope device of claim 1, further comprising a drive shaft located at the axis of rotation of the gyroscope element, the drive shaft connected at a top end to the drive element, and the drive shaft having a substantially rounded bottom end.

3. The gyroscope device of claim 2, wherein the second torque application element can impose a torque on the frame perpendicular to the axis of rotation of the gyroscope element which tilts the axis of rotation of the gyroscope element through gyroscopic effect in a direction perpendicular to torque imposed by the second torque application element, and subsequently tilts the drive shaft so that the bottom of the drive shaft makes rolling contact with a surface and propels the gyroscope device forward, backward, and sideways, based upon the orientation of the torque imposed on the frame.

4. The gyroscope device of claim 1, wherein the first torque application element includes at least one air jet configured to produce a force to counter torque generated by the drive element against the frame of the device.

5. The gyroscope device of claim 1, wherein the second torque application element is configured to shift weight on the frame to alter the center of gravity of the device thereby generating the torque on the gyroscope element.

6. The gyroscope device of claim 5, wherein the second torque application element includes batteries for the drive element which are movable to alter a center of gravity of the device.

7. The gyroscope device of claim 1, wherein the first torque application element includes a tail section on the frame, the tail section configured in combination with restraining barriers on a track to restrict the rotational motion of the frame of the device.

8. The gyroscope device of claim 1, wherein the drive element is configured to impose a torque on the frame.

9. The gyroscope device of claim 8, wherein the first torque application element is configured to produce a counter-torque relative to the torque imposed on the frame by the drive element.

10. The gyroscope device of claim 1, wherein the device is configured to tilt due to gyroscopic effect as a result of the torque imposed by the second torque application element upon the frame which results in rolling contact between the bottom of the rounded shaft and a generally flat surface to propel the device along that surface.

11. The gyroscope device of claim 1, wherein the gyroscope element includes a shaft and a disk, the shaft and the disk configured to rotate together in a same direction.

12. A method comprising:
providing a gyroscope element in association with a frame;
driving the gyroscope element independent of the frame;
applying a torque on the frame to move a bottom portion of a shaft of the gyroscope along a surface; and
applying a countering torque, the countering torque countering the torque on the frame, the countering torque restricting the frame from freely rotating in a direction counter to the gyroscope element, the countering torque stabilizing the frame against the torque on the frame and thereby enabling control of linear motion of the device; and
applying a perpendicular torque on the frame, the perpendicular torque applied perpendicular to the axis of rotation of the gyroscope element to tilt the axis of the gyroscope element and control a direction of motion of the frame.

13. The method of claim 12, further comprising applying a downward force on a front of the frame to impose the perpendicular torque on the frame for forward motion of the device, and applying a downward force on a back of the frame to impose the perpendicular torque on the frame for reverse motion of the device.

14. The method of claim 12, further comprising applying a downward force on a side of the frame to impose the perpendicular torque on the frame for sideways motion of the device.

15. The method of claim 12, further comprising applying a downward force to the frame in a direction parallel to an axis of the gyroscope to impose the perpendicular torque on the frame for motion in a same direction as an orientation of the downward force.

16. The method of claim 12, further comprising restricting free rotation of the frame.

17. The method of claim 12, further comprising tilting the frame from a neutral axis to cause rolling contact of the bottom portion of the shaft of the gyroscope with the surface and thereby cause the device to move along the surface.

18. A gyroscope device comprising:
means for driving a gyroscope element independent of a frame connected to the gyroscope element; and
driving means for developing a torque parallel to an axis of rotation of the gyroscope element, the driving means mounted for countering the torque produced by the driving means to subsequently restrict the driving means from freely rotating in a direction counter to the gyroscope element; and
means for imposing a torque on the frame perpendicular to the axis of rotation of the gyroscope element to tilt the axis of the gyroscope and effect direction of motion, a first torque countering the torque produced by the drive means and subsequently restricting the frame from freely rotating in a direction counter to the gyroscope element, the first torque stabilizing the frame against the torque produced by the drive means and thereby enabling control of the linear motion of the device, and a second torque imposed on the frame perpendicular to the axis of rotation of the gyroscope element to tilt the axis of the gyroscope element and control a direction of motion of the device.

19. The gyroscope device of claim 18, further comprising means for applying a downward force on a front of the frame to impose a torque on the frame for forward motion of the device, and means for applying a downward force on a back of the frame to impose a torque on the frame for reverse motion of the device.

20. The gyroscope device of claim 18, wherein the torque imposed on the frame perpendicular to the axis of rotation of the gyroscope tilts the axis of rotation of the gyroscope in a direction perpendicular to torque imposed on the frame, and subsequently tilts a drive shaft so that the bottom of the drive shaft makes rolling contact with a surface and propels the gyroscope device forward, backward, and sideways, based upon the orientation of the torque imposed on the frame.

* * * * *